US011858586B2

(12) United States Patent
Van Thuyl et al.

(10) Patent No.: US 11,858,586 B2
(45) Date of Patent: Jan. 2, 2024

(54) MOTORCYCLE CONVERSION KIT

(71) Applicants: Zeger Van Thuyl, Bradford (CA); Joe Abare, Bradford (CA)

(72) Inventors: Zeger Van Thuyl, Bradford (CA); Joe Abare, Bradford (CA)

( * ) Notice: Subject to any disclaimer, the term of this patent is extended or adjusted under 35 U.S.C. 154(b) by 346 days.

(21) Appl. No.: 17/101,659

(22) Filed: Nov. 23, 2020

(65) Prior Publication Data
US 2022/0161894 A1 May 26, 2022

(51) Int. Cl.
| B62M 27/02 | (2006.01) |
| B62K 5/027 | (2013.01) |
| B62K 13/00 | (2006.01) |
| B62M 9/02 | (2006.01) |
| B62J 35/00 | (2006.01) |

(52) U.S. Cl.
CPC ............. B62M 27/02 (2013.01); B62J 35/00 (2013.01); B62K 5/027 (2013.01); B62K 13/00 (2013.01); B62M 9/02 (2013.01); *B62M 2027/022* (2013.01); *B62M 2027/025* (2013.01); *B62M 2027/027* (2013.01); *B62M 2027/028* (2013.01)

(58) Field of Classification Search
CPC . B62K 5/027; B62K 5/05; B62K 5/08; B62K 13/00; B62M 27/02; B62M 2027/021; B62M 2027/022; B62M 2027/027; B62M 2027/028; B62D 55/32
USPC ............. 180/9.21, 9.26, 183, 184, 185, 193; 280/7.12, 7.14
See application file for complete search history.

(56) References Cited

U.S. PATENT DOCUMENTS

| 3,336,994 A * | 8/1967 | Pederson | B62M 29/00 180/9.62 |
| 4,662,468 A * | 5/1987 | Ethier | B62D 61/065 180/215 |
| 4,719,982 A * | 1/1988 | Shaver | B62M 27/02 180/9.26 |
| 4,719,983 A * | 1/1988 | Bruzzone | B62K 13/00 180/184 |
| 5,203,424 A * | 4/1993 | Gogo | B62M 27/02 180/231 |
| 5,474,146 A * | 12/1995 | Yoshioka | B62M 27/02 180/184 |
| 6,095,275 A * | 8/2000 | Shaw | B62M 27/02 180/185 |
| 7,182,165 B1 * | 2/2007 | Keinath | B62M 27/02 280/22.1 |

(Continued)

*Primary Examiner* — Anne Marie M Boehler
(74) *Attorney, Agent, or Firm* — Orin Del Vecchio

(57) ABSTRACT

A motorcycle conversion kit for a three wheeled motorcycle wherein the conversion kit of the present invention is operable to transition the motorcycle so as to traverse across a snowy terrain. The conversion kit of the present invention includes a pair of ski assemblies that are operably secured to the front rotor assembly of the motorcycle. The ski assemblies include rotor movement inhibitors. A swing arm assembly is operably coupled to the frame and includes a front portion and a rear portion. The rear portion has rotatably mounted thereto a snow belt drive wheel. The show belt drive wheel is superposed a snow belt of a snow belt assembly wherein the snow belt assembly is secured to the frame of the motorcycle. The kit further includes a fuel cell bracket assembly having support members mounted on opposing sides of the frame and having a compartment rearward of the motorcycle.

13 Claims, 8 Drawing Sheets

(56) References Cited

U.S. PATENT DOCUMENTS

| | | | | |
|---|---|---|---|---|
| 7,357,201 | B2* | 4/2008 | Jordan | B62D 55/04 |
| | | | | 180/9.26 |
| 7,896,362 | B1* | 3/2011 | Scatchard | B62K 13/00 |
| | | | | 280/7.14 |
| 8,915,501 | B2* | 12/2014 | Forcier | B62B 13/18 |
| | | | | 280/11 |
| 2006/0060395 | A1* | 3/2006 | Boivin | B62D 55/0842 |
| | | | | 180/9.21 |
| 2010/0044134 | A1* | 2/2010 | Feutz | B62K 13/04 |
| | | | | 180/183 |
| 2017/0043805 | A1* | 2/2017 | Krammel | B62M 27/02 |
| 2017/0259877 | A1* | 9/2017 | Thompson | B60T 11/16 |
| 2019/0047661 | A1* | 2/2019 | Kinugasa | B62M 27/02 |
| 2020/0361273 | A1* | 11/2020 | Borud | B60H 1/00878 |

\* cited by examiner

MOTORCYCLE CONVERSION KIT

FIELD OF THE INVENTION

The present invention relates generally to motor vehicles, more specifically but not by way of limitation, a motorcycle conversion kit that enables the conversion of a motorcycle to be utilized in a first embodiment and a second embodiment wherein the first and second embodiments provide the ability to travel on roads and snow respectively.

BACKGROUND

As is known in the art motorcycles are a popular form of transportation. Some individuals ride these vehicles for recreation while others utilize them for efficient modes of transportation to work and other destinations. Conventional motorcycles employ a frame having two wheels but three wheeled motorcycles have begun to grow in popularity over the last decade. Commercially available three wheel motorcycles are available in two configurations wherein a first configuration has two wheels at the rear of the motorcycle and a second configuration has two wheels at the front of the motorcycle. The latter configuration provides more stability in maneuvers such as but not limited to turning.

One issue with operating motorcycles is inclement weather and terrain. While certain motorcycles are configured for off-road terrain and all can be operated on roads with the proper equipment, no motorcycles are configured to successfully traverse across material such as snow. In many northern climates this limits the ability for a user to utilize their motorcycle for an extended period of time. In these areas if a rider desires to traverse across snowy terrain a separate vehicle known as a snowmobile must be acquired. This may be cost prohibitive for many and the basic structural design of a three-wheel motorcycle having two wheels in the front is suited for travel on snow but cannot accomplish this without modification which is not provided in existing technology.

Accordingly, there is a need for an motorcycle conversion kit that is operable to convert a three wheeled motorcycle into a vehicle that is suitable to travel on snowy terrain and as such yield a vehicle that provides a first mode and second mode of travel.

SUMMARY OF THE INVENTION

It is the object of the present invention to provide a motorcycle conversion kit that is configured to provide a second mode of travel for a three-wheeled motorcycle enabling travel across a snowy terrain wherein the conversion kit of the present invention includes a modified swing arm assembly.

Another object of the present invention is to provide a conversion kit for a motorcycle to enable switching the motorcycle between a first mode of travel and a second mode of travel wherein the conversion kit of the present invention includes ski attachment bracket operably coupled to the front wheel assembly.

A further object of the present invention is to provide a motorcycle conversion kit that is configured to provide a second mode of travel for a three-wheeled motorcycle enabling travel across a snowy terrain wherein the conversion kit of the present invention includes a drive sprocket having a offset hub for chain position.

Still another object of the present invention is to provide a conversion kit for a motorcycle to enable switching the motorcycle between a first mode of travel and a second mode of travel wherein the conversion kit of the present invention wherein the swing arm assembly includes a track assembly engagement wheel.

An additional object of the present invention is to provide a motorcycle conversion kit that is configured to provide a second mode of travel for a three-wheeled motorcycle enabling travel across a snowy terrain wherein the conversion kit of the present invention further includes rotor engagement members configured to inhibit rotation of brake rotors on the front wheel assembly when the motorcycle is being used in its second mode.

Yet a further object of the present invention is to provide a conversion kit for a motorcycle to enable switching the motorcycle between a first mode of travel and a second mode of travel wherein the conversion kit of the present invention that further includes a snow belt assembly.

Another object of the present invention is to provide a motorcycle conversion kit that is configured to provide a second mode of travel for a three-wheeled motorcycle enabling travel across a snowy terrain wherein the conversion kit of the present invention that further includes a rear bracket assembly having a fuel cell retention area.

Still an additional object of the present invention is to provide a conversion kit for a motorcycle to enable switching the motorcycle between a first mode of travel and a second mode of travel wherein the conversion kit of the present invention wherein the swing arm assembly includes snow belt travel inhibitors.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
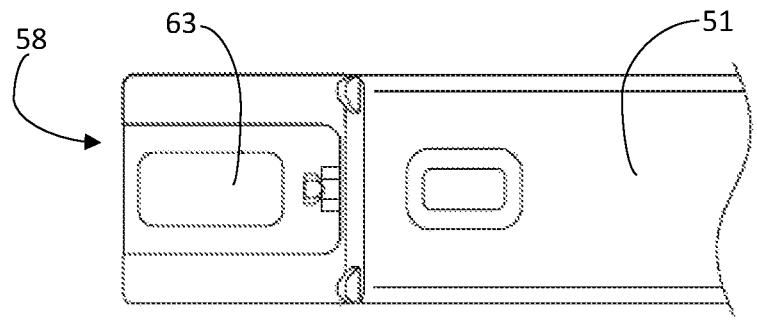
FIG. 1 is a detailed view of the second end of the arm members of the swing arm assembly.
Figure 1:
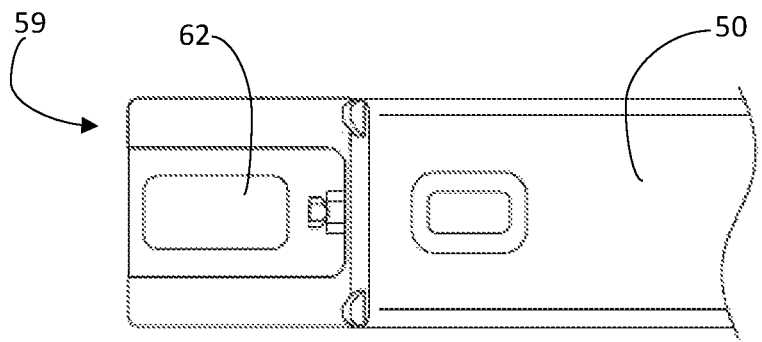

Referring now to the drawings submitted herewith, wherein various elements depicted therein are not necessarily drawn to scale and wherein through the views and figures like elements are referenced with identical reference numerals, there is illustrated a motorcycle conversion kit 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Figure 9:
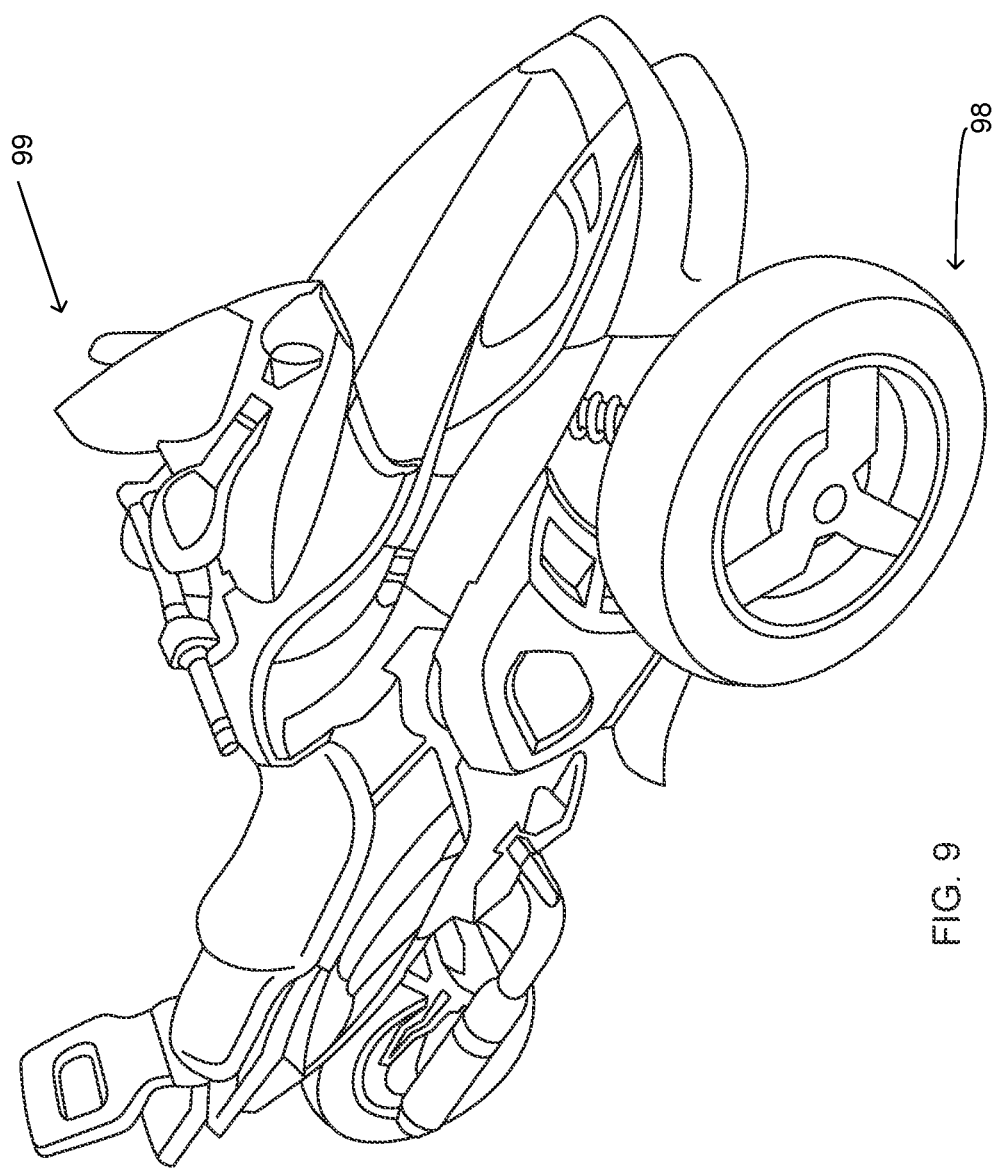
FIG. 9 is a perspective view of the motorcycle in its first mode of configuration; ands
Figure 10:
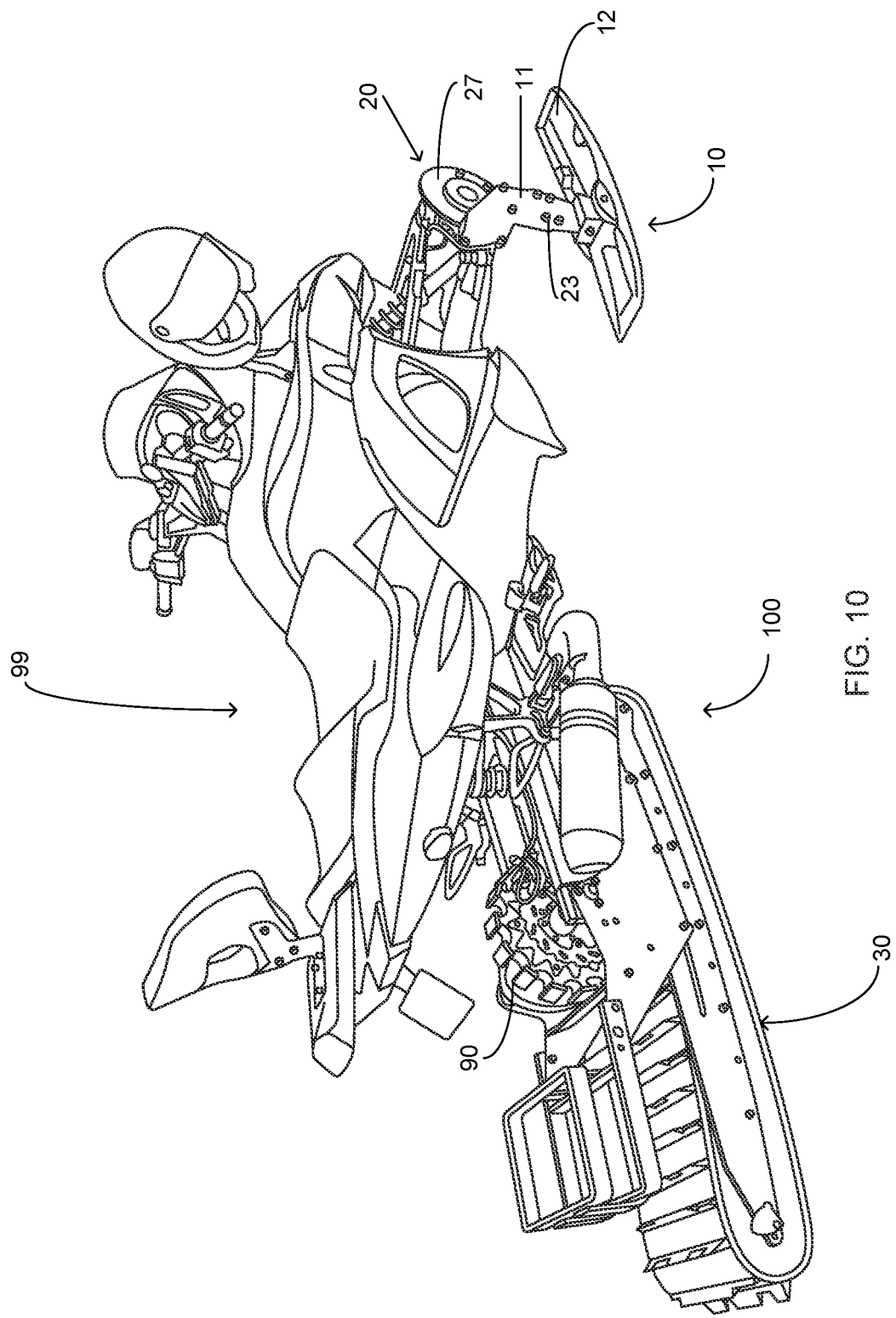
FIG. 10 is a rear perspective view of the motorcycle in its second mode of configuration having the conversion kit of the present invention installed thereon.
Figure 11:
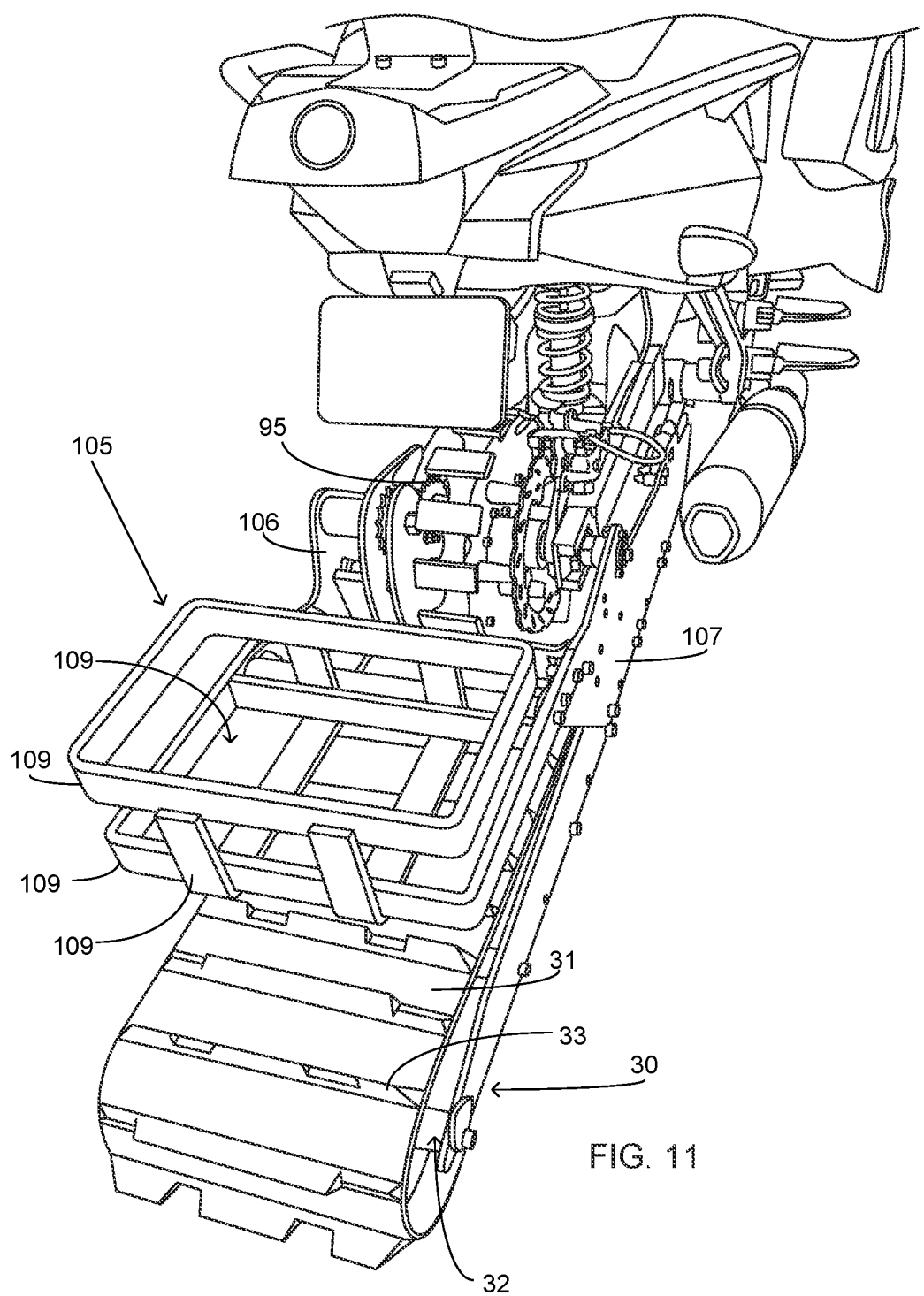
FIG. 11 is a detailed view of the snow belt assembly and rear bracket assembly of the present invention.

Referring in particular to Figures submitted as a part hereof, the motorcycle conversion kit 100 is operable to change a three-wheeled motorcycle between a first mode illustrated herein in FIG. 9 and a second mode illustrated herein in FIG. 10. In the first mode in FIG. 9 the motorcycle 99 is in its original intended configuration and is suitable for traversing across roads and similar surfaces. In FIG. 10, the motorcycle 99 has been converted through installation of the motorcycle conversion kit 100 to traverse across snowy terrains. Ensuing herein is a discussion of the elements of the motorcycle conversion kit 100 that is installed on the motorcycle 99 to convert the motorcycle 99 from a first mode to a second mode wherein the second mode provides the ability to traverse the motorcycle 99 across a snowy terrain.

The motorcycle conversion kit 100 includes two front ski assemblies 10 that are installed on the motorcycle 99 to replace the conventional wheels 98. The front ski assemblies 10 include a vertical support member 11 and ski member 12. The ski member 12 is horizontal in orientation, elongated in shape and is manufactured from a durable material such as but not limited to plastic. The ski member 12 has a sufficient surface area in order to support the front of the motorcycle 99 as it traverses across a snowy terrain. It should be understood within the scope of the present invention that the ski member 12 could be manufactured in alternate lengths and widths in order to achieve the desired objective herein. The vertical support member 11 is operably coupled to the ski member 12 and extends upward therefrom. The vertical support member 11 is operably secured to the ski assembly attachment bracket 15.

Figure 2:
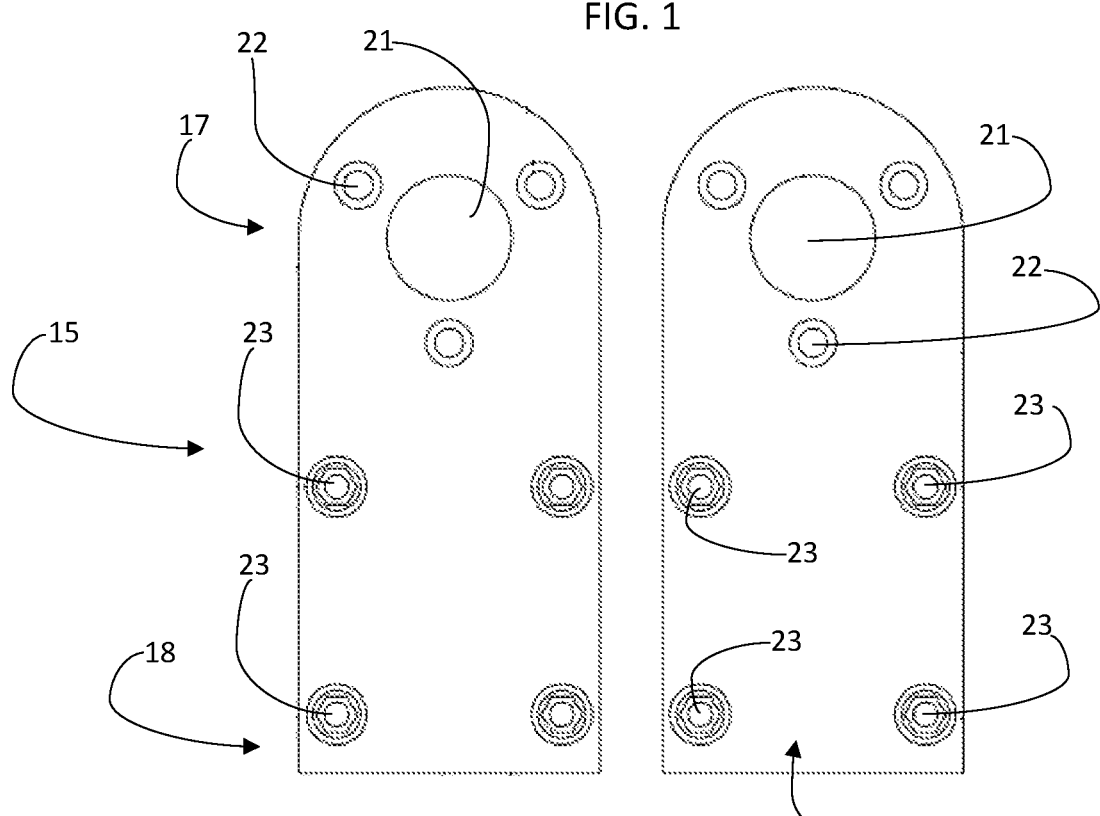
FIG. 2 is detailed view of the ski attachment brackets.
Figure 3:
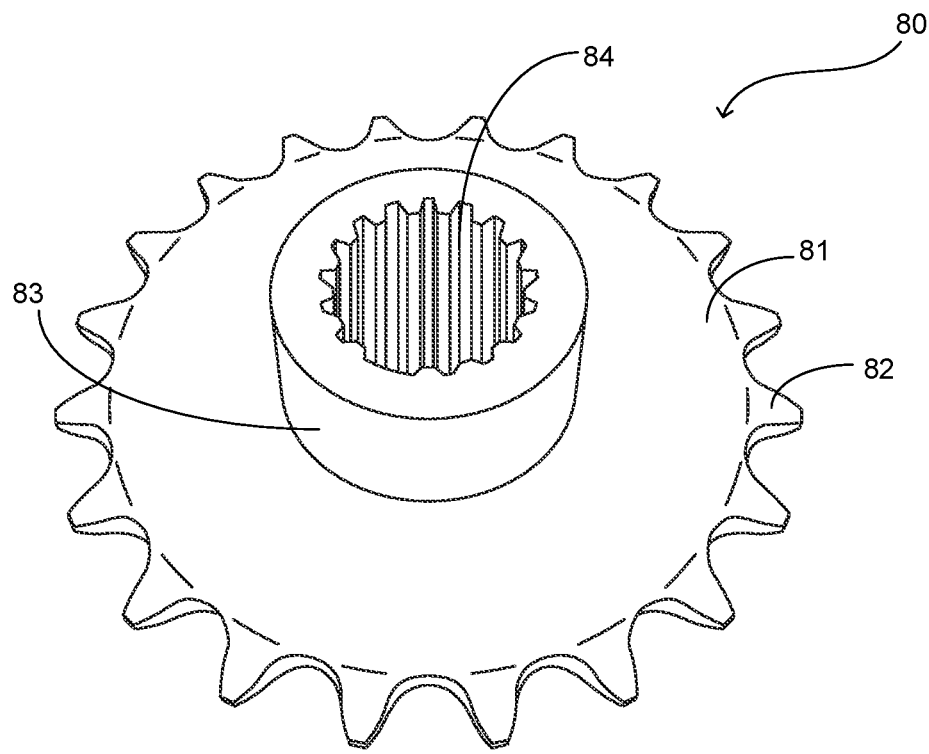
FIG. 3 is a detailed view of the chain drive sprocket.
Figure 4:
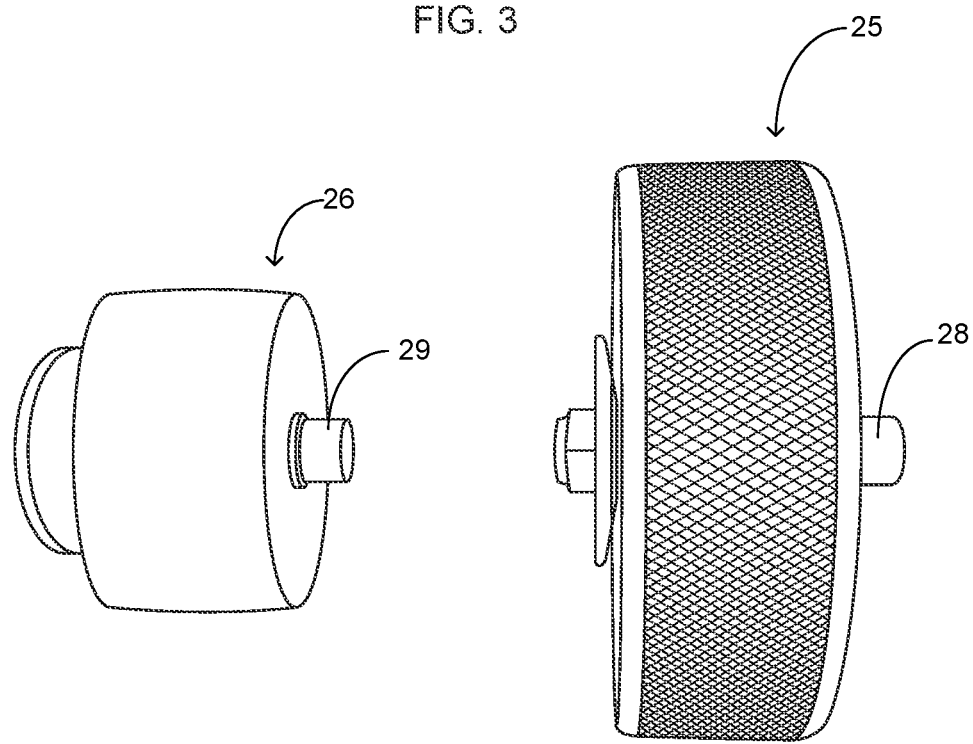
FIG. 4 is a detailed view of the rotor movement inhibitors.

The ski assembly attachment brackets 15 are illustrated herein in FIG. 2. The ski assembly attachment bracket 15 includes a body 16 that is planar in manner and manufactured from a durable rigid material such as but not limited to metal. The body 16 includes a first end 17 and a second end 18. The first end 17 has an arcuate shaped perimeter edge 19 wherein the first end 17 is operably coupled to rotor assembly 20 of the motorcycle 99. The ski assembly attachment bracket 15 includes a bearing cap aperture 21 surrounds by three lug apertures 22. The bearing cap aperture is configured to have a portion of the bearing cap of the rotor assembly journal thereinto while the lug apertures 22 are configured to receive lug bolt (not illustrated herein) therethrough in order to secure the ski assembly attachment bracket 15 to the rotor assembly 20. It should be understood that the layout pattern of the bearing cap aperture 21 with the lug apertures 22 are configured for a particular motorcycle 99 and that alternate arrangements and quantities are contemplated within the scope of the present invention. The ski assembly attachment bracket 15 includes four fasteners 23 that are operable to secure the ski assembly attachment bracket 15 to the vertical support member 11. It should be understood within the scope of the present invention that the ski assembly attachment bracket 15 could employ more or less than four fasteners 23.

The front ski assemblies 10 further include rotor movement inhibitors 25,26. The rotor movement inhibitors 25,26 are placed on opposing ends of a brake caliper present on the rotor 27. The motorcycle 99 includes a conventional rotor 27 and brake calipers (not illustrated herein) so as to properly function and provide braking when the motorcycle 99 is in its first mode of operation. Ensuing installation of the motorcycle conversion kit 100, the motorcycle 99 must be configured so as to inhibit the rotor 27 from spinning as it would in the first mode of operation of the motorcycle 99. The rotor movement inhibitors 25, 26 are positioned on opposing sides of a conventional caliper that is operably coupled to the rotor 27. Fasteners 28,29 are used to secure the rotor movement inhibitors 25, 26 to the rotor 27 and as such will inhibit the rotor 27 from being able to rotationally move. In a preferred embodiment the rotor movement inhibitors 25, 26 are annular in shape and manufactured from a vulcanized rubber. While the rotor movement inhibitors 25,26 are illustrated herein as having different diameters, it should be understood that is to accommodate a particular type of motorcycle 99 and it is contemplated within the scope of the present invention that the rotor movement inhibitors 25,26 could be provided in alternate sizes and shapes.

Figure 5:
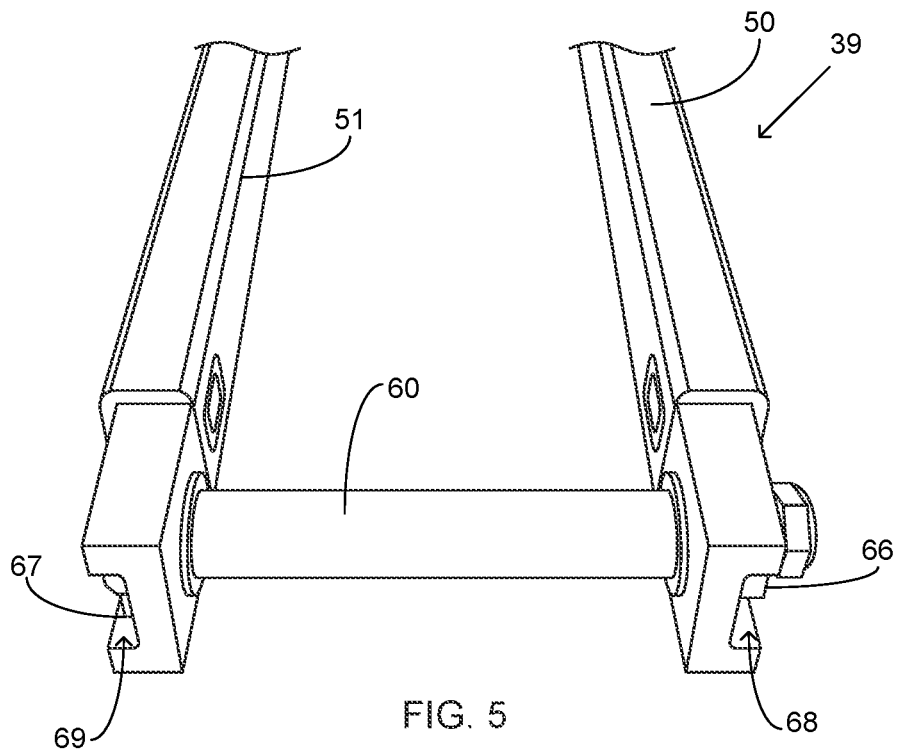
FIG. 5 is detailed view of the rear end of the swing arm assembly of the present invention.
Figure 6:
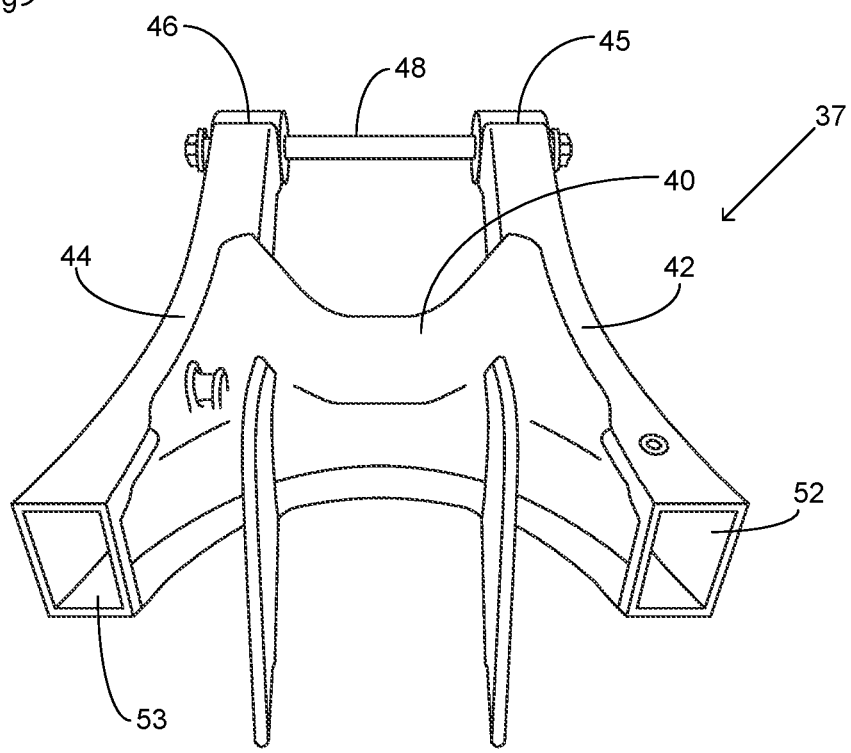
FIG. 6 is a detailed view of the front end of the swing arm assembly of the present invention.
Figure 7:
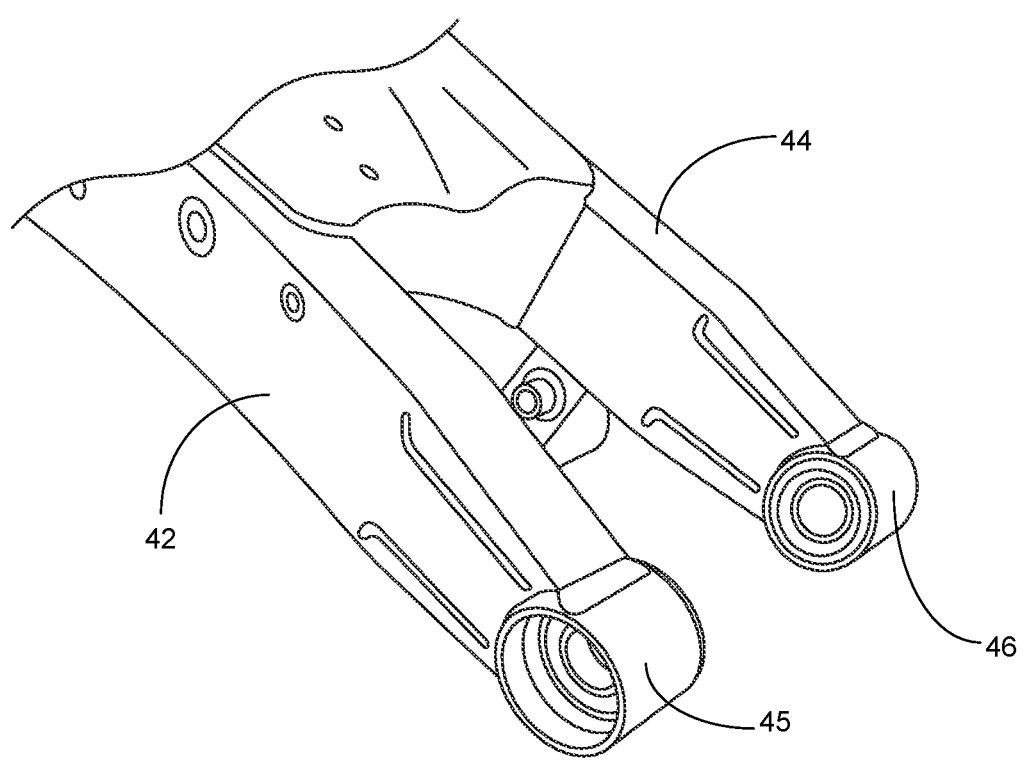
FIG. 7 is a detailed view of the upper portion of the front end of the swing arm assembly.
Figure 8:
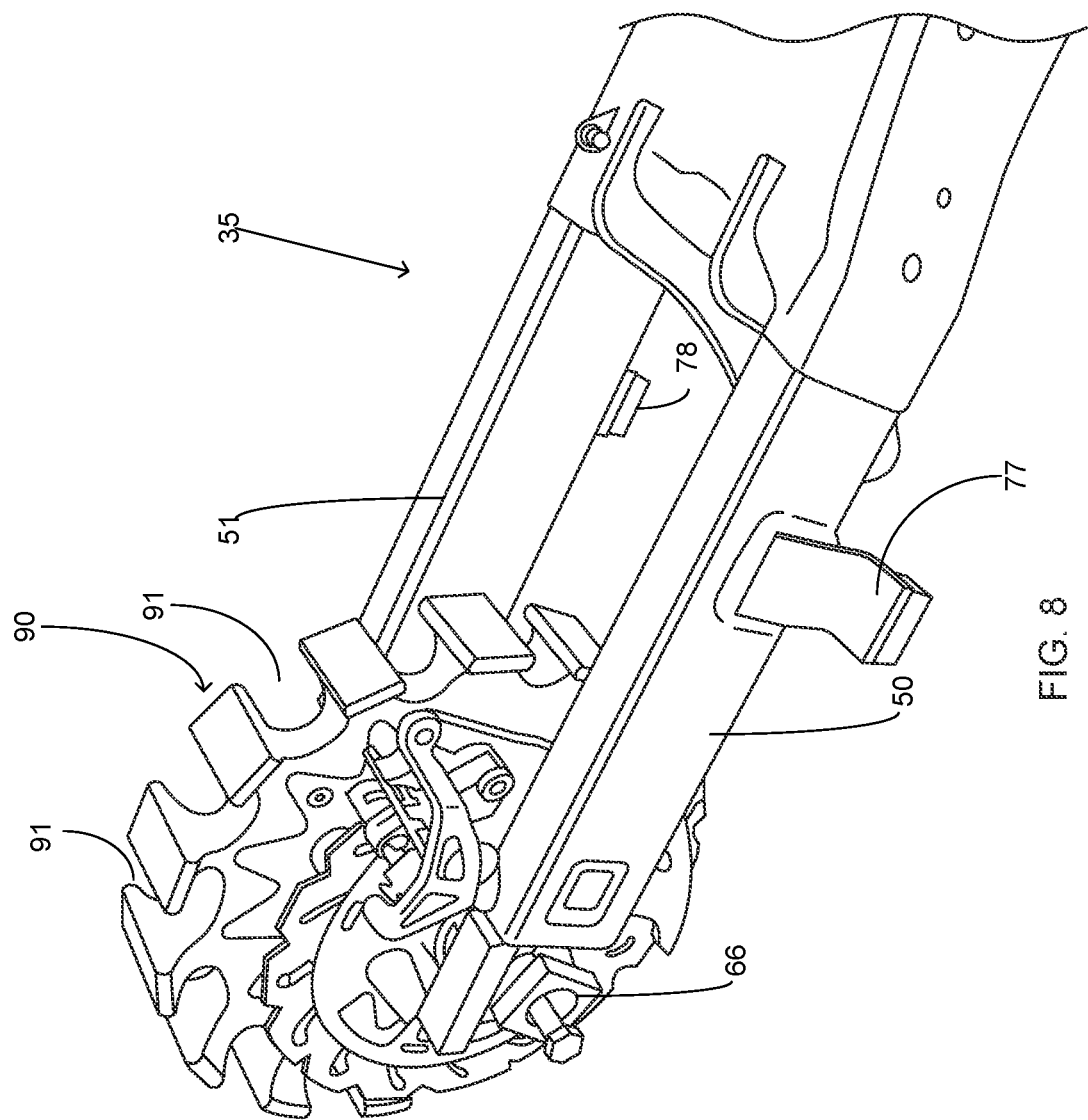
FIG. 8 is a detailed view of the rear portion of the swing arm having the snow belt drive wheel secured thereto.

The snow belt assembly 30 is operably coupled to the motorcycle 99 utilizing swing arm assembly 35. The swing arm assembly 35 includes a front portion 37 and a rear portion 39 illustrated herein in FIGS. 6 and 5 respectively. The front portion 37 of the swing arm assembly 35 an arcuate support member 40 operably coupled intermediate a first support arm 42 and a second support arm 44. The first support arm 42 and second support arm 44 are configured with ends 45,46 to movably coupled to the frame of the motorcycle 99 forward of the snow belt assembly 30. A securing rod 48 is operably coupled intermediate the ends 45,46 and functions to secure the swing arm assembly 35 to the frame of the motorcycle 99. The swing arm assembly 35 includes rear arm members 50, 51. The rear arm members 50,51 are secured to the front portion 37 at joints 52,53 utilizing techniques such as but not limited to welding. The rear arm members 50,51 are manufactured from square tubular metal and extend rearward from the front portion 37 having a void therebetween. The rear arm members 50,51 includes ends 58,59 that are configured to movably secure snow belt drive wheel support rod 60. The snow belt drive wheel support rod 60 is movably secured within apertures 62,63 so as to provide movement thereof in order to adjust tension of the drive chain 95. The positionable securing of the snow belt drive wheel support rod 60 is provided by the mounting blocks 66,67 that are positioned inside recesses 68,69. The mounting blocks 66,67 are mateably shaped to be disposed within the recesses 68,69 and are configured to provide a backward-forwards movement of the snow belt drive wheel support rod 60 in order to place the appropriate amount of tension on the drive chain 95.

The drive chain 95 is operably coupled to drive chain sprocket 80. The drive chain sprocket 80 is operably coupled to the motorcycle 99 and to the snow belt drive wheel 90. The drive chain sprocket 80 includes a plate 81 wherein the plate 81 includes teeth 82 circumferentially disposed thereon that are operable to couple to the drive chain 95. The drive chain sprocket 80 has integrally formed therewith a hub 83 wherein the hub 83 is configured to extend outward from the drive chain sprocket 80 being perpendicular thereto. The hub 83 includes spline arrangement 84 wherein the spline arrangement is configured to operably couple to a drive shaft of the motorcycle 99. The hub 83 is configured so as to provide a necessary offset in order to provide proper positioning of the drive chain 95 so as to couple with the snow belt drive wheel 90 in order to provide operation thereof while avoiding interference from the frame of the motorcycle 99. It should be understood within the scope of the present invention that the drive chain sprocket 80 could be formed in alternate shapes and sizes in order to accommodate different types of motorcycles.

The motorcycle conversion kit 100 further includes a snow belt assembly 30. The snow belt assembly is configured to traverse the motorcycle 99 across a snow terrain. The snow belt assembly includes snow belt 31 that is rotatably coupled to a support frame 32. The snow belt 31 is a conventional snow belt having projections 33 configured to penetrate and engage snow in order to propel the motorcycle 99. Furthermore the projections 33 are spaced so as to operably coupled with the snow belt drive wheel 90 in particular the grooves 91 thereof wherein the rotational movement of the snow belt drive wheel 90 translates to rotational movement of the snow belt 31. The snow belt assembly 30 is operably coupled to the frame of the motorcycle 99 utilizing suitable durable mechanical techniques. The snow belt assembly 30 is positioned so as to have the snow belt drive wheel 90 superposed the snow belt 31. The snow belt drive wheel 90 is rotatably moved by drive chain 95. The swing arm assembly 35 includes snow belt inhibitors 77,78. The snow belt inhibitors 77,78 are L-shaped being manufactured from metal or other suitable material. The snow belt inhibitors 77,78 are secured to rear arm members 50,51 and positioned to inhibit the snow belt 31 from bouncing upward into the shock assembly of the motorcycle 99 during use of the motorcycle 99 in its second mode.

The motorcycle conversion kit 100 further includes a fuel cell bracket assembly 105. The fuel cell bracket assembly 105 is manufactured from a suitable material such as but not limited to aluminum. The fuel cell bracket assembly 105 is operably coupled to the frame of the motorcycle 99 utilizing suitable mechanical techniques. The fuel cell bracket assembly 105 includes a first plate arm member 106 and a second plate arm member 107. The first plate arm member 106 and second plate arm member 107 are secured to opposing sides of the frame of the motorcycle 99. Secured to the first plate arm member 106 and second plate arm member 107 being intermediate thereto is compartment 108. The compartment 108 is manufactured from integrally secured support members 109 forming an interior volume 110 configured to receive a portable fuel cell therein. It should be understood within the scope of the present invention that the support members 109 could be provided in alternate quantities and configurations in order to provide a compartment 108. Furthermore, it should be understood within the scope of the present invention that the compartment 108 could be provided in alternate shapes and sizes.

The preferred embodiment of the motorcycle conversion kit 100 has been illustrated and discussed herein but it should be understood within the scope of the present invention that the motorcycle conversion kit 100 could include alternate elements in addition to the elements illustrated and discussed herein wherein the combination thereof is operable to transition the motorcycle 99 between a first mode and a second mode so as to traverse across different surfaces.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A motorcycle conversion kit configured convert a motorcycle between a first mode and a second mode wherein the second mode is operable to traverse the motorcycle across a snowy terrain wherein the motorcycle kit of the present invention comprises:

a swing arm assembly, said swing arm assembly having a front portion and a rear portion, said front portion being movably secured to a frame of the motorcycle, said rear portion of said swing arm assembly having a first rear arm member and a second rear arm member, said first rear arm member and said second rear arm member being parallel and having a void therebetween, said rear portion of said swing arm assembly having a snow belt drive wheel support rod secured thereto;

a snow belt assembly, said snow belt assembly having a support frame, said support frame having a snow belt movably secured thereto, said snow belt assembly configured to propel the motorcycle across a snowy terrain;
a pair of front ski assemblies, said pair of front ski assemblies configured to be secured to a front portion of the frame of the motorcycle, each of said pair of front ski assemblies including a ski assembly attachment bracket, said ski assembly attachment bracket having a vertical support member secured thereto, said vertical support member having a ski member secured thereto;
a drive sprocket, said drive sprocket having a plate, said drive sprocket having a hub, said hub being integrally formed with said plate and being perpendicular thereto and extending outward therefrom;
wherein said front pair of ski assemblies further includes a rotor movement inhibitor, the rotor movement inhibitor further including a first portion and a second portion, said first portion and said second portion being round in shape, said first portion and said second portion being positioned at opposing ends of a brake caliper on the motorcycle.

2. The motorcycle conversion kit as recited in claim 1, and further including snow belt inhibitors, said snow belt inhibitors being secured to the rear portion of said swing arm assembly, said snow belt inhibitors being L-shaped, said snow belt inhibitors operable to inhibit the snow belt from contacting the frame of the motorcycle.

3. The motorcycle conversion kit as recited in claim 2, and further including a fuel cell bracket assembly, said fuel cell bracket assembly being operably coupled to the frame of the motorcycle and extending rearward therefrom, said fuel cell bracket assembly including a compartment configured to receive a fuel cell.

4. The motorcycle conversion kit as recited in claim 3, wherein said first arm member and said second arm member of said rear portion of the swing arm assembly have recesses formed in ends thereof wherein the ends have the snow belt drive wheel support rod secured thereto.

5. The motorcycle conversion kit as recited in claim 4, wherein said recesses formed in said ends of the first arm member and second arm member have mounting blocks movably secured therein, said mounting blocks configured to provide moveable adjustment of said snow belt drive wheel support rod.

6. A motorcycle conversion kit for a three wheeled motorcycle operable to transition the motorcycle so as to be suitable to operate the motorcycle on a snowy terrain wherein the motorcycle conversion kit comprises:
a swing arm assembly, said swing arm assembly having a front portion and a rear portion, said front portion having an arcuate shaped support member, said front portion having a first end and a second end being movably secured to a frame of the motorcycle, said rear portion of said swing arm assembly having a first rear arm member and a second rear arm member, said rear portion being secured to said front portion and extending outward therefrom, said first rear arm member and said second rear arm member being parallel and having a void therebetween, said first rear arm member having a second end distal to said front portion, said second rear arm member having a second end distal to said front portion, said rear portion of said swing arm assembly having a snow belt drive wheel support rod secured in between said first rear arm member and said second rear arm member at said second ends thereof;
a snow belt assembly, said snow belt assembly having a support frame, said support frame having a snow belt movably secured thereto, said snow belt assembly configured to propel the motorcycle across a snowy terrain;
a snow belt drive wheel, said snow belt drive wheel being rotatably coupled to said snow belt drive wheel support rod, said snow belt drive wheel being superposed said snow belt and further having a plurality of grooves circumferentially disposed thereon so as to be operably coupled with snow belt;
a pair of front ski assemblies, said pair of front ski assemblies configured to be secured to a front portion of the frame of the motorcycle, each of said pair of front ski assemblies including a ski assembly attachment bracket, said ski attachment bracket having a first end and a second end, said first end of said ski attachment bracket having an arcuate perimeter edge, said first end of said ski attachment bracket having a plurality of apertures formed therein, said ski assembly attachment bracket having a vertical support member secured thereto, said vertical support member having ski member secured thereto; and
a first rotor movement inhibitor and a second rotor inhibitor, said first rotor inhibitor being annular in shape, said second rotor inhibitor being annular in shape, said first rotor inhibitor and said second rotor inhibitor being secured on opposing ends of a brake caliper present on the motorcycle.

7. The motorcycle conversion kit as recited in claim 6, and further including a drive sprocket, said drive sprocket having a plate, said plate being annular in shape with teeth circumferentially on an edge thereof, said drive sprocket having a hub wherein the hub is centrally formed on the plate and extends outward therefrom so as to provide an offset position of the plate when coupled to a drive shaft of the motorcycle.

8. The motorcycle conversion kit as recited in claim 7, and further including snow belt inhibitors, said snow belt inhibitors being secured to the first arm member and the second arm member of the rear portion of said swing arm assembly, said snow belt inhibitors being L-shaped, said snow belt inhibitors operable to inhibit the snow belt from contacting the frame of the motorcycle.

9. The motorcycle conversion kit as recited in claim 8, and further including a fuel cell bracket assembly, said fuel cell bracket assembly including a first plate member and a second plate member, said first plate member and said second plate member being located on opposing sides of the frame of the motorcycle, said fuel cell bracket assembly being operably coupled to the frame of the motorcycle and extending rearward therefrom, said fuel cell bracket assembly including a compartment configured to receive a fuel cell.

10. The motorcycle conversion kit as recited in claim 9, wherein said second ends of the first arm member and second arm member of said rear portion of said swing arm assembly have recesses formed thereon on one side thereof.

11. The motorcycle conversion kit as recited in claim 10, and further including mounting blocks, wherein the mounting blocks are movably secured within the recesses on the second ends of the first arm member and second arm member of said rear portion of the swing arm assembly.

12. The motorcycle conversion kit as recited in claim 11, wherein the first rotor movement inhibitor has a diameter that is less than that of the second rotor movement inhibitor.

13. A motorcycle conversion kit configured to convert a three wheeled motorcycle so as to traverse across a snowy terrain wherein the motorcycle conversion kit comprises:

a swing arm assembly, said swing arm assembly having a front portion and a rear portion, said front portion having an arcuate shaped support member, said front portion having a first end and a second end being movably secured to a frame of the motorcycle, said rear portion of said swing arm assembly having a first rear arm member and a second rear arm member, said rear portion being secured to said front portion and extending outward therefrom, said first rear arm member and said second rear arm member being parallel and having a void therebetween, said first rear arm member having a second end distal to said front portion, [[said second ends of the first arm member and second arm member of said rear portion of said swing arm assembly having recesses formed thereon on one side thereof,]] said second rear arm member having a second end distal to said front portion, said second ends of the first arm member and second arm member of said rear portion of said swing arm assembly having recesses formed thereon on one side thereof, said rear portion of said swing arm assembly having a snow belt drive wheel support rod secured in between said first rear arm member and said second rear arm member at said second ends thereof;

a snow belt assembly, said snow belt assembly having a support frame, said support frame having a snow belt movably secured thereto, said snow belt assembly configured to propel the motorcycle across a snowy terrain;

a snow belt drive wheel, said snow belt drive wheel being rotatably coupled to said snow belt drive wheel support rod, said snow belt drive wheel being superposed on said snow belt and further having a plurality of grooves circumferentially disposed thereon so as to operably be coupled with the snow belt;

a pair of front ski assemblies, said pair of front ski assemblies configured to be secured to a front portion of the frame of the motorcycle, each of said pair of front ski assemblies including a ski assembly attachment bracket, said ski attachment bracket having a first end and a second end, said first end of said ski attachment bracket having an arcuate perimeter edge, said first end of said ski attachment bracket having a plurality of apertures formed therein, said ski assembly attachment bracket having a vertical support member secured thereto, said vertical support member having ski member secured thereto; and a first rotor movement inhibitor and a second rotor inhibitor, said first rotor inhibitor being annular in shape, said second rotor inhibitor being annular in shape, said first rotor inhibitor and said second rotor inhibitor being secured on opposing ends of a brake caliper present on the motorcycle, wherein the first rotor movement inhibitor has a diameter that is less than that of the second rotor movement inhibitor; and a fuel cell bracket assembly, said fuel cell bracket assembly including a first plate member and a second plate member, said first plate member and said second plate member being located on opposing sides of the frame of the motorcycle, said fuel cell bracket assembly being operably coupled to the frame of the motorcycle and extending rearward therefrom, said fuel cell bracket assembly including a compartment configured to receive a fuel cell.

\* \* \* \* \*